United States Patent Office 3,786,010
Patented Jan. 15, 1974

3,786,010
POLYMER DISPERSION AND PROCESS FOR
PREPARATION OF THE SAME
Hideyoshi Tsugukuni, Sakai, and Mitsuhiro Matsuda,
Tondabayashi, Japan, assignors to Dainippon Toryo
Co., Ltd., Osaka-shi, Japan
No Drawing. Filed Sept. 7, 1971, Ser. No. 178,454
Claims priority, application Japan, Sept. 8, 1970,
45/78,690; Jan. 23, 1971, 46/2,171; Feb. 15,
1971, 46/6,600
Int. Cl. C08f 47/18
U.S. Cl. 260—21                                  14 Claims

ABSTRACT OF THE DISCLOSURE

This invention relates to a polymer dispersion useful especially as a coating composition, which comprises an organic liquid as a dispersion medium and an oil-modified alkyd resin solvated in the organic liquid, the oil-modified alkyd resin being block- or graft-polymerized with acrylonitrile and other copolymerizable monomers, and to a process for the preparation of such polymer dispersion.

BACKGROUND OF THE INVENTION

(i) Field of the invention

The field of this invention concerns a polymer dispersion for preparing a film having excellent physical and chemical properties such as chemical and water resistance, which comprises as a dispersion medium an organic liquid medium capable of dissolving monomers but incapable of dissolving polymers formed from said monomers, and an oil-modified alkyd resin solvated in the organic liquid, the oil-modified alkyd resin being block- or graft-polymerized with acrylonitrile and other copolymerizable monomers, and to a process for the preparation of such polymer dispersion.

(ii) Prior art of the invention

There have been known organic solvent solutions of styrenated or vinylated alkyd resins prepared by modifying an alkyd resin with styrene or other vinyl type monomer.

However, the molecular weight of such a modified alkyd resin and the concentration of the resin in the solvent solution are naturally subject to some restrictions due to the solubility of the resin. Thus, when the solvent solution is coated on a base material and used in the form of a film, a sufficient coating cannot be obtained. Further, the organic solvent used includes solvents causing photochemical smog or solvents having a relatively high dissolving power and harmful, such as methyl isobutyl ketone, toluene and xylene. Accordingly, the amount of the solvents is regulated under various laws to inhibit environmental pollution, and therefore, a change of paint composition or resin composition is required.

There have also been known coating compositions free from solvents, so-called aqueous emulsions, prepared by emulsifying a synthetic polymer in water.

These conventional solvent solutions and aqueous emulsions of synthetic polymers are insufficient and defective in the following points:

(1) A solution or emulsion of a low viscosity having a high polymer concentration cannot be obtained. For instance, in the case of an organic solvent solution it is impossible to obtain a solution or emulsion having a polymer concentration of 40–50% by weight while retaining the viscosity at a level of about 100 cps.
(2) The water resistance of the resulting film is poor. Since a hydrophilic emulsifier is used in a large amount in an ordinary emulsion composition, the water resistance of a film prepared from such emulsion is extremely poor.
(3) The mechanical properties of the resulting film are inferior. The higher the degree of polymerization of the synthetic polymer in the case of a solvent solution type, the higher the viscosity of the solution. Thus, it is not allowed to use a polymer having a high degree of polymerization, and therefore, the resulting film is inferior with respect to tensile strength, and resistance to thermal degradation and impact.
(4) The gloss of the film is low. The film prepared from an aqueous emulsion type coating composition exhibits only low gloss.
(5) In the emulsion type coating composition, destruction of the emulsion by freezing occurs easily.

Methods for preparing polymer dispersions which do not have above defects are known. Some of them are described below:

(1) A method comprising polymerizing a monomer dissolved in an organic liquid in the presence of a stabilizer composed of a block- or graft-copolymer formed by polymerizing a compound capable of being solvated with said organic liquid and a small proportion of a monomer capable of forming a polymer which is insoluble in the organic liquid (Japanese patent publications No. 7,047/65, No. 21,154/65 and No. 342/70). In this method, the resulting polymer is insoluble in the organic liquid.
(2) A method comprising polymerizing a monomer dissolved in an organic liquid in the presence of a stabilizer composed of a graft- or block-polymer comprising a group compatible with the resulting polymer and a group solvated with the organic liquid (Japanese patent publications No. 23,350/65, No. 13,524/67 and No. 16,147/68).
(3) A method comprising polymerizing a monomer in the presence of a graft-polymer stabilizer having a group soluble in an organic liquid and a group which is insoluble in the organic liquid and incompatible with the resulting polymer but capable of being swollen or dissolved in the monomer (Japanese patent publication No. 14,545/70).
(4) A method comprising polymerizing a monomer in the presence of a stabilizer formed by linking a polymer chain solvated with an organic liquid with a non-solvated chain by an ester, ether, amide or urethane linkage and with a vinyl type unsaturated group which is copolymerizable with the monomer (Japanese patent publication No. 19,186/65).

However, these known methods are defective, because it is necessary to purify a polymer precursor used as the stabilizer or to adopt complicated polymerization steps. For instance, in one of the known methods of group (1), a small portion of a monomer is copolymerized with a group solvated with an organic liquid by employing an initiator for block- or graft-polymerization, to form a fine dispersion containing a block- or graft-copolymer. Subsequently, the initiator remaining in the dispersion is destroyed and the remaining monomer is polymerized in the dispersion with use of another initiator which is incapable or hardly capable of initiating the block- or graft-copolymerization. In this method, the polymerization comprises two steps, each employing a different initiator. Accordingly, this method is very complicated and involves operational difficulties.

The stabilizer is usually used only for dispersing the polymer stably in the organic liquid medium, and thus the amount of the stabilizer is reduced to the minimum.

The stabilizer is contained generally from 1 to 10% and at most 25% by weight of the non-volatile components in the polymer dispersion.

In known polymer dispersions, the main component is a vinyl copolymer or an acrylic copolymer, and most of them are used for baking. The amount of the stabilizer is restricted for preventing reduction of physical properties of a coating film formed by baking.

Also polymer dispersions containing an oil as a stabilizer have been known. However, films prepared from these dispersions are inferior in chemical properties, especially chemical resistance. For this reason, they are hardly applied to practical use.

Any of the conventional polymer dispersions is obtained by polymerizing vinyl monomers in an organic liquid having no polarity or a very low dissolving power. When an organic liquid having a polarity or a high dissolving power is incorporated in the resulting polymer dispersion, there is a possibility that the dispersed particles will be dissolved, destroyed or gelled. Therefore, it is impossible to use such conventional polymer dispersions in the form of thermosetting resin solutions by mixing them with a polymer solution containing an organic liquid having high polarity or high dissolving power. For instance, it is impossible to obtain a thermosetting resin solution by mixing conventional polymer dispersions with an amino resin solution containing an organic solvent such as xylene or toluene.

SUMMARY OF THE INVENTION

This invention relates to a novel polymer dispersion free of above mentioned defects of conventional polymer dispersions and to a process for preparing such improved polymer dispersion.

A primary object of the invention is to provide a dispersion of a copolymer made from acrylonitrile and at least one other monomer and dispersed stably in an organic liquid by dint of an oil-modified alkyd resin, whereby the dispersion can give a film of excellent properties, especially when it is used as a paint, and to provide a process for preparing the dispersion.

More specifically, this invention is to provide a polymer dispersion having excellent characteristics as follows:

(1) The polymer concentration in the dispersion is high and a viscosity is retained at a lower level. (The solids concentration in the polymer dispersion is 5-65% by weight, preferably 30-50% by weight and the viscosity lower than 100-200 cps.)
(2) Dispersed polymer particles have solvent resistance.
(3) The polymer dispersion has excellent storage and mechanical stability.
(4) The polymer dispersion can form a film having excellent chemical and solvent resistance.

In accordance with this invention, there is provided a polymer dispersion comprising (a) an organic liquid as a dispersion medium, and (b) an unsaturated fatty acid-containing oil-modified alkyd resin which is subjected to a block- or graft-polymerization with acrylonitrile and at least one other copolymerizable monomer provided that the organic liquid is capable of dissolving the monomers but incapable of dissolving the polymer formed by polymerization of the monomers and the oil-modified alkyd resin is solvated in the organic liquid, whereby the polymer dispersion is stably dispersed in the organic liquid by means of the oil-modified alkyd resin.

By the term "dispersion" used in this invention is meant, for instance, the following polymer dispersions and compositions:

(1) A polymer dispersion, wherein the oil-modified alkyd resin contains OH groups, and acrylonitrile and at least one other copolymerizable monomer are block- or graft-copolymerized to the resin.

(2) A composition formed by incorporating an aminoplast resin into the polymer dispersion described above (1).

(3) A polymer dispersion, wherein the modified alkyd resin contains OH groups, and acrylonitrile, OH group-containing unsaturated monomers and at least one other copolymerizable monomer are copolymerized with the resin.

(4) A composition formed by incorporating an aminoplast resin into the polymer dispersion described above (3).

(5) A polymer dispersion, wherein the oil-modified alkyd resin is free of OH groups, and acrylonitrile, OH group-containing unsaturated monomers and at least one other copolymerizable monomer are block- or graft-polymerized with the resin.

(6) A composition formed by incorporating an aminoplast resin into the polymer dispersion described above (5).

Also in accordance with this invention, there is provided a process for the preparation of polymer dispersions comprising polymerizing in the organic liquid a readily block- or graft-polymerizable monomer to the unsaturated fatty acid-containing oil-modified alkyd resin solvated in the organic liquid, and then polymerizing at least one of the other copolymerizable monomers to the resulting graft- or block-polymerized alkyd resin, the organic liquid being capable of dissolving the monomers but incapable of dissolving a polymer formed from the monomers.

It has been found that better results are obtained in practising the above process when acrylonitrile is used as the monomer readily block- or graft-polymerizable with the oil-modified alkyd resin.

It has also been found that better results are obtained in practising the above process when the ratio of the oil-modified alkyd resin/copolymerizable monomers inclusive of acrylonitrile is within a range of from 80/20 to 33.3/66.7 or when the ratio of the oil-modified alkyd resin/copolymerizable monomers is within the above range and the amount of acrylonitrile is 10–99% by weight of the total of the monomers.

The process of this invention (called a two-stage process for convenience) has the following advantages:

(a) Temperature control is accomplished easily.
(b) The polymer formed from the resulting polymer dispersion has excellent gloss.
(c) It is possible to obtain a polymer dispersion having excellent mechanical stability.
(d) It is possible to obtain a polymer dispersion having good storage stability.
(e) It is possible to inhibit formation of a homopolymer not copolymerized with the oil-modified alkyd resin.

In the process of this invention, when acrylonitrile is used alone or in combination with at least one other copolymerizable monomer, there can be obtained a good polymer dispersion and therefore, the resulting film shows an excellent solvent resistance.

Films prepared from known polymer dispersions are resistant against organic liquids to be used for the preparation of the dispersions, but the films hardly exhibit any resistance against organic liquids having a high dissolving power such as ethyl acetate and butyl acetate. When a paint comprising the organic liquid having a high dissolving power is applied to films formed from conventional polymer dispersions, the films are dissolved or swollen, whereby disadvantages such as lifting occur. Therefore, the known polymer dispersions have not been used satisfactorily as compositions for primer coating.

On the other hand, the polymer dispersion of this invention is free of such defect because it provides a film having excellent solvent resistance.

In the polymer dispersion of this invention, the ratio of the oil-modified alkyd resin/copolymerizable monomers is adjusted within a range of from 80/20 to 33.3/ 66.7. At the ratio of alkyd resin exceeding 80%, the solvent resistance of the film formed from the dispersion is inferior, whereas at the ratio of the monomers exceeding 90%, the film-forming property of the polymer dispersion is poor. Acrylonitrile is used in an amount of from 10 to 99% by weight, preferably from 40 to 90% by weight, of the copolymerizable monomers. The proportions of the oil-modified alkyd resin, acrylonitrile and other copolymerizable monomer are chosen depending on the desired solvent resistance and the other properties of the film.

Since dispersed particles of the polymer dispersion of this invention have good solvent resistance (they are not dissolved or destroyed even in contact with solvents having a high dissolving power such as xylene and butanol), it is possible to mix the dispersion with the aminoplast solution containing a solvent having high dissolving power.

Further, when the oil-modified alkyd resin containing OH groups and/or the OH group-containing unsaturated monomer is used for the block- or graft-polymerization, the dispersed particles contain OH groups and therefore, it is possible to provide a thermosetting composition by incorporating the aminoplast resin into the resulting polymer dispersion. Films formed from the thermosetting composition are excellent, especially in water and corrosion resistance.

The ratio of the polymer dispersion/aminoplast resin (on the solid basis) is in the range of from 40/60 to 95/5, preferably 60/40 to 80/20. If the amount of the aminoplast resin is too high, mechanical and physical properties such as impact resistance of the film are lowered.

As the aminoplast resin to be incorporated in the polymer dispersion, there may be used melamine derivatives such as butylated melamine and butylated methylol melamine, benzoguanamine derivatives such as butylated methylol benzoguanamine, urea derivatives such as octyl alcohol-modified urea and butylated methylol urea, phenol derivatives, and the like.

The films obtained from the thermosetting compositions are improved over films obtained from conventional solvent-type amino alkyd resin compositions with respect to acid resistance, water resistance and weather resistance.

Of course, the polymer dispersion of this invention can be thermosetting without incorporation of the aminoplast resin. More specifically, the dispersed particles themselves are self-curing on heating. They can be obtained by:

(1) block- or graft-polymerizing at least one copolymerizable monomer such as glycidyl methacrylate to the OH group-containing oil-modified alkyd resin;
(2) graft- or block-polymerizing the OH group-containing unsaturated monomer and at least one copolymerizable monomer such as glycidyl methacrylate to the OH group-containing oil-modified alkyd resin; or
(3) block- or graft-polymerizing the OH group-containing unsaturated monomer and at least one copolymerizable monomer such as glycidyl methacrylate to the oil-modified alkyd resin free of the OH groups.

In short, by introducing at least one of the copolymerizable monomers having groups easily reacting with the OH groups, there can be obtained dispersed particles which are self-curing on heating. Therefore, the films are excellent in water and chemical resistance.

The organic liquid to be used in this invention, which is capable of dissolving monomers but incapable of dissolving polymers formed from the monomers, includes organic liquids having no polarity or a relatively low dissolving power, such as aliphatic and aromatic hydrocarbons, e.g., VM & P naphtha, mineral spirits, kerosene, petroleum naphtha and solvent naphtha; aliphatic hydrocarbons, e.g., n-butane, n-hexane, n-heptane, n-octane, isononane, n-decane and n-dodecane; and alicyclic hydrocarbons, e.g., cyclopentane, cyclohexane and cycloheptane. They may be used singly or in the form of admixtures of two or more.

The oil-modified alkyd resins solvated with the organic liquid to be used in this invention include those obtained by polycondensing:

(1) a basic acid component selected from (a) saturated polybasic acids such as phthalic anhydride, terephthalic acid, isophthalic acid, tetrachlorophthalic anhydride, tetrahydrophthalic anhydride, succinic acid, adipic acid and sebacic acid, (b) unsaturated polybasic acids such as maleic acid and anhydride, fumaric acid, itaconic acid and citraconic anhydride, (c) polybasic acids obtained by diene-synthesis such as cyclopentadiene-maleic anhydride adduct, terpene-maleic anhydride adduct and rosin-maleic anhydride adduct, and (d) monobasic acids such as benzoic acid and p-tert-butyl benzoic acid;
(2) a polyhydric alcohol component selected from (a) dihydric alcohols such as ethylene glycol, diethylene glycol, triethylene glycol, propylene glycol, trimethylene glycol and tetramethylene glycol, (b) trihydric alcohols such as glycerine and trimethylol propane, and (c) polyhydric alcohols such as diglycerol, triglycerol, 1,2,6-hexanetriol, sorbitol, pentaerythritol, dipentaerythritol and mannitol; and
(3) an oil component selected from soybean oil, linseed oil, China wood oil, castor oil, dehydrated castor oil, safflower oil, coconut oil, tall oil, cottonseed oil, olive oil and rice-bran oil, fatty acids such as oleic acid, linoleic acid, eleostearic acid, ricinoleic acid and dehydrated ricinoleic acid.

These oil-modified alkyd resins may be prepared by condensing the above components by usual methods, and they have a molecular weight of 500–10,000, preferably 2,000–4,000, and an acid value of 1–75, preferably 10–20. In the preparation of the oil-modified alkyd resins, it is possible to obtain OH group-containing or OH group-free products optionally by selecting starting materials or reaction conditions complying with known techniques.

In the preparation of the polymer dispersion of this invention, the oil-modified alkyd resin is solvated with the organic liquid as the dispersion medium and acts as a protective colloid dispersing polymer particles stably in the organic liquid. Further, when the resulting polymer dispersion is used as a composition for air drying, the oil-modified alkyd resin acts as a plasticizer helping aggregation and adhesion of polymer particles at the time of the film formation and is cured by oxidative polymerization after the film formation.

By the term "copolymerizable monomer" used in this invention is meant a monomer capable of reacting with the oil-modified alkyd resins to form block- or graft-polymers. Examples are (a) nitrile type monomers such as acrylonitrile, methacrylonitrile and fumaronitrile; (b) allyl type monomers such as allyl acetate, diallyl adipate, allyl chloride, allyl alcohol, 2-chloroallyl acetate, 2-chloroallyl chloride, methallyl acetate and methallyl chloride; (c) ethylene type monomers such as cis-dichloroethylene, trans-dichloroethylene, tetrachloroethylene and trichloroethylene; (d) unsaturated dibasic acids such as maleic anhydride, diethyl maleate and fumaric acid; (e) unsaturated carboxylic acids such as acrylic acid, methacrylic acid and itaconic acid; (f) acrylic acid esters such as methyl acrylate, ethyl acrylate, n-propyl acrylate, iso-propyl acrylate, n-butyl acrylate, iso-butyl acrylate, tert-butyl acrylate, 2 - ethylhexyl acrylate, lauryl acrylate, dodecyl acrylate, stearyl acrylate, cyclohexyl acrylate, dimethylaminoethyl acrylate, diethylaminoethyl acrylate and glycidyl acrylate; (g) methacrylic acid esters such as methyl methacrylate, ethyl methacrylate, n-propyl methacrylate, iso-propyl methacrylate, n-butyl methacrylate, iso-butyl methacrylate, tert-butyl methacrylate, 2-ethylhexyl methacrylate, lauryl methacrylate, dodecyl methacrylate, stearyl methacrylate, cyclohexyl methacrylate, dimethylaminoethyl methacrylate, diethylaminoethyl methacrylate and glycidyl methacrylate; (h) styrene type monomers such as styrene, vinyl toluene and α-methyl styrene; and (i) other monomers such as vinyl acetate, vinyl formate, vinyl propionate, vinyl stearate, divinyl benzene, di-iso-propenyl benzene, dimethyl itaconate, vinyl chloride and vinylidene chloride. These monomers may be used singly or in the form of admixtures of two or more monomers.

The monomer readily graft- or block-polymerizable with the oil-modified alkyd resin in this invention includes some of the above copolymerizable monomers, namely (a) nitrile type monomers such as acrylonitrile, methacrylonitrile and fumaronitrile; (b) allyl type monomers such as allyl acetate, diallyl adipate, allyl chloride, allyl alcohol, 2-chloroallyl acetate, 2-chloroallyl chloride, methallyl acetate and methallyl chloride; (c) ethylene type monomers such as cis-dichloroethylene, trans - dichloroethylene, tetrachloroethylene and trichloroethylene; and (d) other monomers such as crotonic acid, maleic anhydride, maleic acid, diethyl maleate and fumaric acid.

In case the copolymerizable monomer is solid at room temperature, it is necessary to use the monomer incorporated and dissolved in another monomer which is liquid at room temperature.

In case a combination of two or more of the above copolymerizable monomers is employed, it is preferred that an alkyl ester of acrylic or methacrylic acid having 1–3 carbon atoms in the alkyl portion, a vinyl ester monomer having 3–5 carbon atoms in the alkyl portion, or a styrene type monomer is used in an amount greater than 20% by weight of the total monomers.

Examples of the hydroxyl containing unsaturated monomers in this invention are 2-hydroxyethyl acrylate, 2-hydroxypropyl acrylate, 2-hydroxyethyl methacrylate, 2-hydroxypropyl methacrylate, N-methylol acrylamide and the like. They may be used singly or in the form of admixtures of two or more.

It is not always necessary to exclude a polymerization inhibitor found in commercial products, such as hydroquinone, from the above copolymerizable monomers and OH group-containing monomers.

A radical initiator may be used for the preparation of polymer dispersions. Examples of organic peroxide initiators are benzoyl peroxide, lauroyl peroxide, cumene hydroperoxide, di-tert-butyl peroxide and acetyl peroxide, and nitrile type initiators such as α,α'-azobisisobutyronitrile. The amount of the initiator is 0.01–3% by weight, preferably 0.5–1% by weight based on the total monomers inclusive of acrylonitrile.

In carrying out the process of this invention, the reaction temperature is 50–140° C., preferably 70–100° C. and the polymerization time is preferably 1–10 hours. The copolymerizable monomers or OH group-containing monomers may be added in two or more portions. It is preferable to feed nitrogen into the reactor during the polymerization reaction, but feeding of nitrogen is not always necessary. In some special cases, for instance, in case gaseous monomers are used, the reaction may be carried out under pressure.

In the polymer dispersions obtained according to this invention, the average size of the dispersed particles is within the range of from 0.1 to 10μ.

Additives usually used for paint compositions such as organic or inorganic coloring pigments, extenders, dyestuffs, driers, etc. may be added to the polymer dispersion of this invention, if desired.

Thus, in accordance with this invention there can be provided polymer dispersion useful especially as coating compositions.

Further, films having excellent gloss, water resistance, chemical resistance, wearth resistance, solvent resistance and other properties can be prepared from the polymer dispersions.

In case the polymer dispersion is used as a coating composition, it may be coated on a substrate e.g., a plate of a metal such as iron, aluminum, zinc and zinc-plated steel, a plywood, a wooden board, paper, cloth, fabrics and plastics and the like.

This invention will now be described in more detail by referring to examples and comparative examples, where all of "parts" and "percentage" are on the weight basis, unless otherwise indicated.

EXAMPLE 1

A flask equipped with a stirrer, a thermometer and a cooling device was charged with 1000 parts of a soybean oil-modified, medium oil alkyd resin varnish obtained by the customary condensation reaction of soybean oil, phthalic anhydride, glycerine and ethylene glycol (oil length=50%; and value=15; mineral spirit solution containing 70% of non-volatile components), 1100 parts of mineral spirits, 200 parts of acrylonitrile and 1.4 parts of benzoyl peroxide, and the inside atmosphere of the flask was substituted by nitrogen. The mixture was reacted at 80° C. for 1 hour under agitation and heating.

After completion of the above first stage reaction, the second stage reaction was effected for about 2 hours by adding dropwise 400 parts of methyl methacrylate, 100 parts of styrene and 7 parts of benzoyl peroxide to the contents of the reactor, and the reaction was further continued for 5 hours at 80° C. Thus, there was obtained a milky-white polymer dispersion having a solids content of 50% and a viscosity of $Y-Z_3$ measured by Gardner-Holdt method at 20° C.

In the thus obtained polymer dispersion, the copolymerized component formed from acrylonitrile and other copolymerizable monomers were completely copolymerized with the alkyd resin component at a weight ratio of 1:1.

EXAMPLE 2

The same reactor as used in Example 1 was charged with 1500 parts of mineral spirits, 2000 parts of the alkyd resin varnish (same as used in Example 1), 70 parts of acrylonitrile and 1.4 parts of benzoyl peroxide, and the mixture was heated at 80° C. for 1 hour under agitation to effect the reaction.

Then, 140 parts of styrene, 490 parts of ethyl methacrylate and 7 parts of benzoyl peroxide were added dropwise to the contents of the reactor in the same manner as in Example 1, and the polymerization was carried out under the same conditions as in Example 1.

Thus, there was obtained a milky-white polymer dispersion having a solids content of 50%, in which the average size of the dispersed particles was 1μ and the copolymerized component from the copolymerizable monomers was completely copolymerized with the alkyd resin component at a weight ratio of 1:2.

EXAMPLE 3

The same reactor as used in Example 1 was charged with 550 parts of mineral spirits, 55 parts of maleic anhydride, 1.1 parts of benzoyl peroxide and 1100 parts of a safflower oil-modified, medium oil alkyd resin varnish prepared by the known method (mineral spirit solution containing 50% of non-volatile components; oil length =45%; acid value=10), and the polymerization was conducted under the same conditions as in Example 1.

Then, a mixture of 385 parts of methyl methacrylate, 110 parts of styrene and 5.5 parts of benzoyl peroxide was added dropwise to the contents of the reactor for about 1.5 hours, following which the second stage polymerization was conducted in the same manner as in Example 1.

Thus, there was obtained a milky-white polymer dispersion having a solids content of 50%, in which the average size of the dispersed particles was 0.5–0.8μ and the alkyd resin component was completely copolymerized with the component formed from the copolymerizable monomers at a weight ratio of 1:1.

EXAMPLE 4

The same reactor as used in Example 1 was charged with 550 parts of mineral spirits, 1100 parts of a safflower oil-modified alkyd resin varnish (same as in Example 3), 55 parts of acrylonitrile and 1.1 parts of benzoyl peroxide, and the mixture was heated at 80° C. under agitation for 1 hour to effect the reaction.

After completion of the above first stage reaction, the second stage reaction was effected by adding dropwise a mixture of 350 parts of styrene, 35 parts of vinyl toluene, 110 parts of ethyl acrylate and 5.5 parts of benzoyl peroxide to the contents of the reactor for about 2 hours, and the reaction was further continued for 5 hours at 80° C. under agitation.

Thus, there was obtained a milky-white polymer dispersion of a non-volatile component content of 50%, in which the alkyd resin component was completely copolymerized with the component derived from the copolymerizable monomers at a weight ratio of 1:1.

Comparative Example 1

The same reactor as used in Example 1 was charged with 1100 parts of mineral spirits, 1000 parts of the soybean oil-modified alkyd resin varnish as used in Example 1, 490 parts of methyl methacrylate, 210 parts of styrene and 7 parts of benzoyl peroxide, and the reaction was conducted under a nitrogen atmosphere at 80° C. for 8 hours under agitation. The resulting polymer dispersion had a nonvolatile component content of 50%.

Comparative Example 2

The same reactor as used in Example 1 was charged with 550 parts of mineral spirits, 1100 parts of the safflower oil-modified alkyd resin varnish as used in Example 3, 385 parts of methyl methacrylate, 165 parts of styrene and 5.5 parts of benzoyl peroxide, and the reaction was conducted in the same manner as in Comparative Example 1.

Using the polymer dispersions obtained in Examples 1–4 and Comparative Examples 1 and 2, paints of the following formulation were prepared by treating in a three roller mill:

| | Parts |
|---|---|
| Titanium oxide | 25 |
| Polymer dispersion | 70 |
| Drier | 0.5 |
| Solvent | 4.5 |
| Total | 100 |

Each of the resulting paints was coated on a steel plate which had been treated with zinc phosphate, and was allowed to dry thereon. Properties of the thus formed films were examined, and it was found that films formed from the dispersions obtained in the examples of this invention were far superior to those formed from dispersions obtained in the comparative examples in both chemical and physical properties. When the paints were compared with respect to storage stability and mechanical stability, it was found that products according to this invention were superior to the products of the comparative examples. Results of these comparisons are shown in Table 1.

EXAMPLE 5

A 1 liter four-neck flask equipped with a stirrer, a reflux cooler, a thermometer, 300-cc. dropping funnel and a nitrogen inlet tube was charged with 200 parts of a soybean oil-modified alkyd resin varnish (same as in Example 1 except with a non-volatile component content of 50%), 200 parts of mineral spirits, 20 parts of acrylonitrile and 0.2 part of benzoyl peroxide, and the dropping funnel was charged with 40 parts of acrylonitrile, 40 parts of ethyl acrylate, 100 parts of methyl methacrylate and 0.9 part of benzoyl peroxide.

The contents of the flask reactor were reacted under nitrogen atmosphere for 1 hour by heating at 85° C. under agitation. Then, the contents of the dropping funnel were added dropwise to the reactor for 3 hours, and the agitation was continued for another 2 hours at 85° C.

Thus, there was obtained a milky-white polymer dispersion, in which the average size of the dispersed particles was 1μ and which had a solids content of 50%.

EXAMPLE 6

The same reactor as used in Example 5 was charged with 400 parts of the safflower oil-modified alkyd resin varnish (same as in Example 3) and 200 parts of mineral spirits. The dropping funnel was charged with 100 parts of acrylonitrile, 5 parts of acrylic acid, 75 parts of methyl methacrylate, 17 parts of styrene, 3 parts of vinyl toluene and 2 parts of benzoyl peroxide.

The contents of the reactor were heated at 85° C. under a nitrogen atmosphere, and the contents of the dropping funnel were added dropwise thereto for 5 hours at a constant rate, following which the agitation was further continued for 5 hours at 85° C.

Thus, there was obtained a white, opaque polymer dispersion having a solids content of 50% and a viscosity of V measured by the Gardner-Holdt method at 20° C., in which the average size of the dispersed particle was 0.1–0.5μ.

EXAMPLE 7

The same reactor as used in Example 5 was charged with a mixture of 400 parts of a linseed oil-modified, medium oil alkyd resin varnish prepared by conducting the condensation according to the known method (non-volatile component content of 50%, acid value of 16, oil length of 50%) and 100 parts of mineral spirits.

The dropping funnel equipped to the reactor was charged with 70 parts of acrylonitrile, 10 parts of ethyl acrylate, 10 parts of methyl methacrylate, 10 parts of styrene, 0.25 part of benzoyl peroxide and 0.25 part of α,α'-azobisisobutyronitrile.

The contents of the reactor were heated at 85° C. under a nitrogen atmosphere and the mixture was stirred. The contents of the dropping funnel were added dropwise for 2 hours at a constant rate to the contents of the reactor, and the heating reaction was continued at 85° C. for 8 hours under agitation.

Thus, there was obtained a white, opaque polymer dispersion having a solids content of 50% and a viscosity of Q measured by the Gardner-Holdt method at 20° C., in which the average size of the dispersed particles was about 0.1μ.

TABLE 1

| | Gloss of film (60°) | Storage stability | | Mechanical stability | |
|---|---|---|---|---|---|
| | | 20° C., 3 months | 20° C., 6 months | 1,000 r.p.m., 60 minutes | 10,000 r.p.m., 60 minutes |
| Ex. 1 | 94 | Not changed | Not changed | Not changed | Not changed. |
| Ex. 2 | 95 | do | do | do | Do. |
| Ex. 3 | 94 | do | do | do | Do. |
| Ex. 4 | 95 | do | do | do | Do. |
| Comparative Ex. 1 | 90 | do | Viscosity increased and phase separation occurred. | do | Particle destruction and phase separation occurred. |
| Comparative Ex. 2 | | do | do | do | Do. |

Comparative Example 3

The same reactor as used in Example 5 was charged with 400 parts of the safflower oil-modified alkyd resin varnish (same as in Example 3) and 200 parts of mineral spirits, and the dropping funnel was charged with 180 parts of methyl methacrylate, 20 parts of styrene and 2 parts of benzoyl peroxide.

The reaction was carried out in the same manner as in Example 6 to obtain a polymer dispersion having a solids content of 50% and a viscosity of Y measured by the Gardner-Holdt method at 20° C., in which the average size of the dispersed particles was about 1μ.

Comparative Example 4

The same reactor as used in Example 5 was charged with 60 parts of the soybean oil-modified alkyd resin varnish (same as in Example 5), 360 parts of mineral spirits, 20 parts of acrylonitrile, 180 parts of ethyl acrylate, 160 parts of methyl methacrylate and 4 parts of benzoyl peroxide, and the reaction was conducted at 85° C. for 8 hours under agitation.

The resulting polymer dispersion had a solids content of 50% and a viscosity of S measured by the Gardner-Holdt method at 20° C. Because of the low content of the alkyd resin, the dispersed particles could not be formed into a film at room temperature as it was prepared. In order to conduct the film formation at room temperature using these dispersed particles, it was necessary to copolymerize the component in the particles with a large amount of monomers having a low softening point such as ethyl acrylate and thereby plasticize the interior thereof.

Using the polymer dispersions obtained in Examples 5-7 and Comparative Examples 3 and 4, coating paints were prepared by kneading mixtures of the following formulation by means of a 3 roller mill:

| | Parts |
|---|---|
| Titanium oxide | 40 |
| Polymer dispersion | 40 |
| Drier and other additives | 0.5 |
| Solvent | 19.5 |
| Total | 100 |

Each of the thus formed paints was coated on a mild steel plate treated with zinc phosphate so that the thickness of the resulting film would be 40μ, and was air-dried. The resulting films were subjected to the solvent resistance test, where various solvents were dropped on the films and their conditions were observed. Results of the solvent resistance test are shown in Table 2.

TABLE 2

| | Ethyl acetate | Butyl acetate | Xylene | Toluene | Lacquer thinner |
|---|---|---|---|---|---|
| Ex. 5 | O | O | O | O | O |
| Ex. 6 | O | O | O | O | O |
| Ex. 7 | O | O | O | O | O |
| Comparative Ex. 3 | X | X | X | X | X |
| Comparative Ex. 4 | X | X | X | X | X |

NOTE.—O = No change was brought about on the film; X = Dissolution or cracking of the film occurred.

As seen from the results shown in Table 2, the films formed from the polymer dispersions of this invention have a resistance against organic liquids having a high dissolving power, and thus the polymer dispersions of this invention can be used sufficiently as primer coating compositions for a coating composition containing an organic liquid having a high dissolving power such as ethyl acetate or butyl acetate (for instance, lacquer).

EXAMPLE 8

A reactor equipped with a stirrer, a dropping funnel, a thermometer, a cooling tube and a nitrogen inlet tube was charged with a mixture comprising 2000 parts of a soybean oil-modified alkyd resin having a non-volatile component content of 50% (in the form of a mineral spirit solution), an oil length of 50%, an acid value of 15 and an excess OH group ratio of 25%, and which had been prepared from soybean oil, phthalic anhydride, glycerine and ethylene glycol by the known method, 1000 parts of mineral spirits, 100 parts of acrylonitrile and 1 part of benzoyl peroxide, and the mixture was reacted in a nitrogen atmosphere at 80° C. under agitation for 1 hour.

Then, a mixture comprising 700 parts of methyl methacrylate, 200 parts of styrene and 9 parts of benzoyl peroxide was added dropwise to the contents of the reactor from the dropping funnel for about 2 hours, and the reaction was further conducted at 80° C. for 7 hours under agitation.

Thus, there was obtained a milky-white polymer dispersion having a solids content of 49.5–50% and a viscosity of U–V measured by the Gardner-Holdt method at 20° C.

Then, 100 parts of the resulting polymer dispersion were blended with 20 parts of a butylated melamine resin solution (a non-volatile component content of 50%; xylene-butanol mixed solvent solution). The resulting mixture was coated on a mild steel plate treated with zinc phosphate, and heated at 140° C. for 30 minutes to prepare a film of 40μ thickness. The film was subjected to comparative tests shown in Table 3.

EXAMPLE 9

The same reactor as used in Example 8 was charged with a mixture comprising 2000 parts of a cottonseed oil-modified, medium oil alkyd resin varnish (non-volatile component content of 50%, oil length of 50%, acid value of 15 and excess OH group ratio of 25%) prepared from cottonseed oil-fatty acid, phthalic anhydride, pentaerythritol and ethylene glycol by the known method, and 1000 parts of mineral spirits. When the temperature of the contents was elevated to 83° C. by heating, a mixture comprising 300 parts of acrylonitrile, 450 parts of methyl methacrylate, 50 parts of ethyl acrylate, 180 parts of styrene, 20 parts of vinyl toluene and 10 parts of benzoyl peroxide were added dropwise to the contents of the reactor from the dropping funnel for 2 hours, and then the reaction was further conducted at 83° C. for 8 hours under agitation.

Thus, there was obtained a milky-white polymer dispersion having a solids content of 49.5–49.8% and a viscosity of X–Y measured by the Gardner-Holdt method at 20° C.

Then, 100 parts of the thus formed polymer dispersion were blended with 20 parts of the same butylated melamine resin solution as used in Example 8. Any destruction or dissolution of the dispersed particles was not observed in the resulting mixture. Then, the mixture was coated on a mild steel plate such as described in Example 8 and heat-treated at 130° C. for 30 minutes to prepare a film of 40μ, which was subjected to comparative tests shown in Table 3.

EXAMPLE 10

The same reactor as used in Example 8 was charged with a mixture comprising 1000 parts of a cottonseed oil-modified, medium oil alkyd resin varnish having a non-volatile component content of 50%, an oil length of 50% and an acid value of 16, which had been prepared from cottonseed oil-fatty acid, phthalic anhydride, glycerine and ethylene glycol by the known method, and 1000 parts of mineral spirits. The temperature was controlled to 83° C. and a mixture comprising 100 parts of acrylonitrile, 600 parts of methyl methacrylate, 100 parts of N-methylol acrylamide, 200 parts of styrene and 10 parts of benzoyl peroxide was added to the contents of the reactor dropwise for about 2 hours from the dropping funnel, and the reaction was furthered at 83° C. for 8 hours under agitation. Thus, there was obtained a milky-white polymer dispersion having a solids content of 49.5–50% and a viscosity of V–W measured by the Gardner-Holdt method at 20° C. Then, 100 parts of the polymer dispersion were blended with 20 parts of the same butylated melamine resin solution as used in Example 8 and the blend was kneaded with 40 parts of titanium oxide. In the resulting composition, dissolution or destruction of the dispersed polymer particles did not occur.

The resulting composition was treated in the same manner as in Example 9, and the resulting film was subjected to comparative tests shown in Table 3.

EXAMPLE 11

The same reactor as used in Example 8 was charged with 1000 parts of mineral spirits, 1000 parts of a cottonseed oil-modified alkyd resin the same as used in Example 9, 100 parts of acrylonitrile and 1 part of benzoyl peroxide, and in the same manner as in Example 10, a mixture of 50 parts of 2-hydroxyethyl methacrylate, 200 parts of styrene, 200 parts of acrylonitrile, 400 parts of methyl methacrylate and 50 parts of ethyl acrylate was added dropwise to the contents of the reactor from the dropping funnel for about 2 hours, following which the reaction was conducted under the same conditions as in Example 10. Thus, there was obtained a milky-white polymer dispersion having a non-volatile component content of 49.5–49.8% and a viscosity of U–V measured by the Gardner-Holdt method at 20° C.

Then, 100 parts of the thus formed polymer dispersion were blended with 20 parts of a butylated methylol melamine resin varnish (xylene-butanol mixed solvent solution having a non-volatile component of 50%), 40 parts of titanium oxide and 20 parts of xylene, and the mixture was kneaded.

The resulting mixture was treated in the same manner as in Example 9, and the resulting film of 40μ thickness was subjected to comparative tests shown in Table 3.

EXAMPLE 12

The same reactor as used in Example 8 was charged with 1000 parts of mineral spirits and 2000 parts of the same cottonseed oil-modified alkyd resin varnish as used in Example 10, and a mixture of 300 parts of acrylonitrile, 600 parts of methyl methacrylate, 50 parts of glycidyl methacrylate, 50 parts of 2-hydroxyethyl methacrylate and 10 parts of benzoyl peroxide was added dropwise to the contents of the reactor. The conditions adopted at the dropwise addition and polymerization were the same as adopted in Example 10. Thus, there was obtained a milky-white polymer dispersion having a solids content of 49.8% and a viscosity of S–T measured by Gardner-Holdt method at 20° C.

Then, 100 parts of the thus formed polymer dispersion were blended with 30 parts of titanium oxide and the mixture was kneaded. The mixture was coated on a mild steel plate such as described above and subjected to heat treatment at 170° C. for 30 minutes to form a film.

EXAMPLE 13

The same reactor as used in Example 8 was charged with 1000 parts of mineral spirits, 1000 parts of the same cottonseed oil-modified alkyd resin as used in Example 10, 100 parts of acrylonitrile and 1 part of benzoyl peroxide, and the mixture was heated under a nitrogen atmosphere at 85° C. for 1 hour under agitation. Then, a mixture of 200 parts of acrylonitrile, 500 parts of methyl methacrylate, 100 parts of styrene, 100 parts of 2-hydroxyethyl methacrylate and 9 parts of benzoyl peroxide was added dropwise to the contents of the reactor in the same manner as in the preceding examples, and the reaction was furthered at 85° C. for 10 hours under agitation. Thus, there was obtained a polymer dispersion having a solids content of 50% and a viscosity of T–U measured by the Gardner-Holdt method at 20° C.

Then, 100 parts of the thus formed polymer dispersion were blended with 30 parts of a butylated methylol benzoguanamine resin varnish (xylene:butanol mixed solvent solution having a non-volatile component content of 50%), and the mixture was coated on a mild steel plate such as described above and subjected to heat treatment at 130° C. for 30 minutes.

EXAMPLE 14

The same reactor as used in Example 8 was charged with 1000 parts of mineral spirits and 1000 parts of the same cottonseed oil-modified alkyd resin varnish as used in Example 9, and then the temperature inside the reactor was elevated to 85° C. under agitation, following which a mixture of 300 parts of acrylonitrile, 500 parts of methyl methacrylate, 50 parts of methyl acrylate, 100 parts of glycidyl methacrylate, 50 parts of N-methyl acrylamide and 10 parts of benzoyl peroxide was added to the contents of the reactor dropwise from the dropping funnel for 3 hours. Thus, there was obtained a milky-white polymer dispersion having a solids content of 49.9% and a viscosity of R measured by the Gardner-Holdt method at 20° C.

Then, 100 parts of the thus formed polymer dispersion were blended with 30 parts of titanium oxide and the mixture was kneaded by means of a 3 roller mill. The mixture was coated on a mild steel plate such as described above and subjected to heat treatment at 150° C. for 30 minutes to form a film.

EXAMPLE 15

The same reactor as used in Example 8 was charged with 1000 parts of mineral spirits, 2000 parts of the same cottonseed oil-modified alkyd resin as used in Example 9, 100 parts of acrylonitrile and 1 part of benzoyl peroxide, and they were reacted at 83° C. for 1 hour in a nitrogen atmosphere. Then, a mixture of 20 parts of acrylonitrile, 30 parts of ethyl acrylate, 650 parts of methyl methacrylate, 180 parts of styrene, 20 parts of vinyl toluene and 9 parts of benzoyl peroxide was added dropwise to the contents of the reactor for 2 hours, and the reaction was further conducted at 85° C. for 8 hours under agitation. Thus, there was obtained a polymer dispersion having a solids content of 50% and a viscosity of V measured by the Gardner-Holdt method at 20° C.

Then, 100 parts of the thus formed polymer dispersion were blended with 30 parts of a butylated methylol urea resin varnish (xylene:butanol mixed solvent solution having a non-volatile component content of 50%) and the mixture was coated on a steel plate such as described above and heat-treated at 130° C. for 30 minutes. The resulting film was subjected to comparative tests shown in Table 3.

EXAMPLE 16

The same reactor as used in Example 8 was charged with 1000 parts of mineral spirits and 1000 parts of the same cottonseed oil-modified alkyd resin varnish as used in Example 9, and heated to 85° C., and then a mixture of 100 parts of acrylonitrile, 550 parts of methyl methacrylate, 50 parts of ethyl methacrylate, 200 parts of styrene, 100 parts of 2-hydroxyethyl acrylate and 10 parts of benzoyl peroxide was added dropwise to the contents of the reactor for 3 hours from the dropping funnel. Subsequently the reaction was carried out at 85° C. for 10 hours under agitation. Thus, there was obtained a polymer dispersion having a solids content of 50% and a viscosity of V measured by the Gardner-Holdt method at 20° C.

Then, 100 parts of the thus formed polymer dispersion were blended with 30 parts of an octyl alcohol-modified urea resin varnish (mineral spirit solution having a non-volatile component content of 50%), and the mixture was coated on a mild steel plate such as described above and heat-treated at 150° C. for 30 minutes to form a film. The resulting film was subjected to comparative tests shown in Table 3.

Comparative Example 5

70 parts of the same cottonseed oil-modified alkyd resin varnish as used in Example 9 were blended with 30 parts of the same butylated methylol melamine resin varnish as used in Example 11 and 35 parts of titanium oxide, and the mixture was kneaded, coated on a mild steel plate such as described above, and heat-treated at 130° C. for 30 minutes. The resulting film was subjected to comparative tests shown in Table 3.

Comparative Example 6

70 parts of the same soybean oil-modified alkyd resin varnish as used in Example 8 were blended with 30 parts of the same butylated methylol melamine resin varnish as used in Example 11 and 35 parts of titanium oxide, and the mixture was kneaded, coated on a mild steel plate such as described above and heat-treated at 130° C. for 30 minutes. The resulting film was subjected to comparative tests shown in Table 3.

persion is stably dispersed in the organic liquid by means of the oil-modified alkyd resin.

2. The dispersion in accordance with claim 1 wherein the oil-modified alkyd resin contains at least one hydroxyl group.

3. The dispersion in accordance with claim 1 wherein the copolymerizable monomers are a combination of hydroxyl containing unsaturated monomers and other copolymerizable monomers.

4. The dispersion in accordance with claim 2 which comprises an aminoplast resin as an additional component.

5. The dispersion in accordance with claim 4 wherein the copolymerizable monomers are a combination of hydroxyl containing unsaturated monomers and other copolymerizable monomers.

6. The polymer dispersion in accordance with claim 1 wherein the oil-modified alkyd resin is free from hydroxyl groups.

7. The dispersion in accordance with claim 6 wherein the copolymerizable monomers are a combination of hydroxyl containing unsaturated monomers and other copolymerizable monomers.

8. The dispersion in accordance with claim 7 which

TABLE 3

| | Pencil hardness | Gloss (60°) | Adhesion | Erichsen test (6.0 mm.) | Impact resistance test (½″ x 500 g. x 50 cm.) | Water resistance (after immersion of 100 hrs.) | Acid resistance (5% H₂SO₄; after immersion of 100 hrs.) | Salt spray test (200 hrs.) | Outdoor exposure (six months) |
|---|---|---|---|---|---|---|---|---|---|
| Ex. 8 | >2H | 93 | Good | Passed | Passed | Not changed | Not changed | Not changed | Not changed. |
| Ex. 9 | >2H | 95 | do | do | do | do | do | do | Do. |
| Ex. 10 | >2H | 94 | do | do | do | do | do | do | Do. |
| Ex 11 | >2H | 95 | do | do | do | do | do | do | Do. |
| Ex. 12 | >2H | 94 | do | do | do | do | do | do | Do. |
| Ex. 13 | >2H | 94 | do | do | do | do | do | do | Do. |
| Ex. 14 | >2H | 93 | do | do | do | do | do | do | Do. |
| Ex. 15 | >2H | 95 | do | do | do | do | do | do | Do. |
| Ex. 16 | >2H | 94 | do | do | do | do | do | do | Do. |
| Comparative Ex. 5. | F–H | 93 | do | do | do | Swollen | Swollen and rusted | Rusted | Stained. |
| Comparative Ex. 6. | F–H | 93 | do | do | do | do | do | do | Do. |

As is seen from Examples 8–16 and the results of the comparative tests shown in Table 3, the films formed from polymer dispersions of this invention in which dispersed polymer particles had excellent solvent resistance and could be dispersed stably even by addition of the solvent having high dissolving power, were no less better than the films formed from conventional amino alkyd resin paints with respect to the adhesion, impact strength and Erichsen characteristics, and they were much superior to the films from the conventional amino alkyd resin paints with respect to hardness, water and acid resistance, brine spray resistance and resistance against outdoor exposure.

What we claim is:

1. A synthetic polymer dispersion useful as a coating composition comprising a non-polar organic liquid having a relatively low dissolving power as a dispersion medium, and an unsaturated fatty acid containing oil-modified alkyd resin wherein said resin is subjected to a block- or graft-polymerization with acrylonitrile and at least one other copolymerizable monomer, the ratio of oil-modified alkyd resin/copolymerizable monomer being from 80/20 to 33.3/66.7 by weight and 10 to 99% by weight of acrylonitrile being contained in the total copolymerizable monomers, provided that said organic liquid is capable of dissolving the monomers but incapable of dissolving a polymer formed by polymerization of the monomers and said oil-modified alkyd resin is solvated in the organic liquid, whereby said polymer dispersion comprises an aminoplast resin as an additional component.

9. The dispersion in accordance with claim 1 wherein the organic liquid is selected from the group consisting of aliphatic and aromatic hydrocarbons.

10. A process for the preparation of a polymer dispersion useful as a coating composition comprising polymerizing in a non-polar organic liquid having a relatively low dissolving power acrylonitrile with an unsaturated fatty acid containing oil-modified alkyd resin solvated in the organic liquid, and then polymerizing at least one other copolymerizable monomer to the resulting block- or graft-polymerized alkyd resin, said organic liquid being capable of dissolving the monomers but incapable of dissolving a polymer formed by polymerization of the monomers.

11. The process in accordance with claim 10 wherein firstly acrylonitrile is block- or graft-polymerized to the oil-modified alkyd resin and secondly a mixture of acrylonitrile and at least one other copolymerizable monomer is polymerized to the resulting block- or graft-polymerized alkyd resin.

12. The process in accordance with claim 10 wherein the ratio of the oil-modified alkyd resin mixture of acrylonitrile and monomer is within a range of from 80/20 to 33.3/66.7.

13. The process in accordance with claim 12 wherein the amount of acrylonitrile is from 10 to 99% by weight based on the total copolymerizable monomers.

14. The process in accordance with claim 10 wherein the organic liquid is selected from the group consisting of aliphatic and aromatic hydrocarbons.

References Cited

UNITED STATES PATENTS

| | | | |
|---|---|---|---|
| 3,640,931 | 2/1972 | Clarke et al. | 260—23 EM |
| 2,938,873 | 5/1960 | Kazenas | 252—301.2 R |
| 3,412,034 | 11/1968 | McIntosh et al. | 252—301.2 R |
| 3,419,515 | 12/1968 | Schmidle et al. | 260—33.6 UA |
| 3,532,662 | 10/1970 | Ansdell | 260—34.2 |

FOREIGN PATENTS

| | | | |
|---|---|---|---|
| 958,023 | 5/1964 | Great Britain | 260—33.6 UA |
| 822,709 | 10/1959 | Great Britain | 260—33.6 UA |
| 1,095,288 | 12/1967 | Great Britain | 260—33.6 UA |
| 1,143,404 | 2/1969 | Great Britain | 260—33.6 UA |

HOSEA E. TAYLOR, Primary Examiner

R. W. GRIFFIN, Assistant Examiner

U.S. Cl. X.R.

117—132 R, 161 K, 161 LN; 260—22 CQ, 22 CB, 33.6 UA